(12) United States Patent
Pan et al.

(10) Patent No.: US 10,027,125 B2
(45) Date of Patent: Jul. 17, 2018

(54) CONTROL METHOD AND SYSTEM FOR PHOTOVOLTAIC INVERTERS WHOSE AC SIDES ARE CONNECTED IN PARALLEL

(71) Applicant: Sungrow Power Supply Co., Ltd., Hefei, Anhui (CN)

(72) Inventors: Nianan Pan, Anhui (CN); Lin Cheng, Anhui (CN); Lei Tao, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 243 days.

(21) Appl. No.: 14/969,411

(22) Filed: Dec. 15, 2015

(65) Prior Publication Data

US 2016/0190811 A1 Jun. 30, 2016

(30) Foreign Application Priority Data

Dec. 31, 2014 (CN) .......................... 2014 1 0852886

(51) Int. Cl.
| | |
|---|---|
| *H02M 7/44* | (2006.01) |
| *H02J 3/38* | (2006.01) |
| *H02M 7/493* | (2007.01) |
| *H02S 40/32* | (2014.01) |
| *H02M 1/12* | (2006.01) |

(52) U.S. Cl.
CPC ............... *H02J 3/383* (2013.01); *H02M 7/44* (2013.01); *H02M 7/493* (2013.01); *H02S 40/32* (2014.12); *H02M 2001/123* (2013.01); *Y02E 10/563* (2013.01)

(58) Field of Classification Search
CPC ............. H02J 3/383; H02M 3/04; H02M 7/48

USPC ........................................................... 307/82
See application file for complete search history.

(56) References Cited

U.S. PATENT DOCUMENTS

| | | | | |
|---|---|---|---|---|
| 6,838,611 B2* | 1/2005 | Kondo | ..................... | H02J 3/383 |
| | | | | 136/244 |
| 7,893,346 B2* | 2/2011 | Nachamkin | ............. | H02J 3/382 |
| | | | | 136/244 |
| 8,227,942 B2* | 7/2012 | Marroquin | ........ | H01L 31/02021 |
| | | | | 307/147 |

(Continued)

FOREIGN PATENT DOCUMENTS

| | | |
|---|---|---|
| CN | 202634314 U | 12/2012 |
| CN | 103368375 A | 10/2013 |

(Continued)

OTHER PUBLICATIONS

Chinese 1st Office Action corresponding to Application No. 201410852886.2; dated Apr. 6, 2016, with English translation.

(Continued)

*Primary Examiner* — Ryan Jager
(74) *Attorney, Agent, or Firm* — Cantor Colburn LLP (57) ABSTRACT

A control method and apparatus for photovoltaic inverters connected in parallel at an AC side are provided and the method includes the following steps: detecting a first direct voltage of the first inverter and a second direct voltage of the second inverter; obtaining a difference between the first direct voltage and the second direct voltage; and adjusting the direct voltages of the inverters to control the difference to be within a predetermined range and control a common-mode voltage in the common-mode loop to be within a predetermined common-mode voltage range.

10 Claims, 3 Drawing Sheets

(56) References Cited

U.S. PATENT DOCUMENTS

| | | | | |
|---|---|---|---|---|
| 9,639,106 | B2* | 5/2017 | Gazit | G05F 3/08 |
| 9,712,083 | B2* | 7/2017 | Ding | H02M 7/483 |
| 2004/0076027 | A1* | 4/2004 | Wu | H02M 3/1584 |
| | | | | 363/65 |
| 2009/0283129 | A1* | 11/2009 | Foss | H02M 7/493 |
| | | | | 136/244 |
| 2010/0283325 | A1* | 11/2010 | Marcianesi | G05F 1/67 |
| | | | | 307/82 |
| 2014/0015326 | A1* | 1/2014 | Eberhardt | H02J 3/383 |
| | | | | 307/82 |
| 2017/0047742 | A1* | 2/2017 | Narla | H02J 3/385 |

FOREIGN PATENT DOCUMENTS

| | | |
|---|---|---|
| CN | 103701150 A | 4/2014 |
| DE | 102008056256 A1 | 5/2010 |
| DE | 102012102209 A1 | 9/2012 |
| EP | 2879287 A1 | 6/2015 |
| JP | H0515689 U | 2/1993 |
| JP | H06113401 A | 4/1994 |
| JP | 2002252927 A | 9/2002 |
| JP | 2011036045 A | 2/2011 |
| JP | 2014509824 A | 4/2014 |
| WO | 2013024496 A1 | 2/2013 |

OTHER PUBLICATIONS

Jing Long et al., "Analysis of Common Mode Voltage Between Parallel Photovoltaic Inverters DC-Link", China Academic Journal Electronic Publishing House, vol. 35, No. 11, Nov. 2011, pp. 2106-2112, with English abstract.

Japanese 1st Office Action corresponding to Patent No. 2015-248328; dated Feb. 6, 2017, with English summary.

Extended European Search Report corresponding to Application No. 15199425.8-1804; dated May 9, 2016.

Mikko Purhonen et al., "Wireless Circulating Current Control for Parallel Connected Photovoltaic Inverters", AFRICON, 2013, Date of Conference: Sep. 9-12, 2013, pp. 1-4.

* cited by examiner

Prior Art

FIG. 1

Prior Art

CONTROL METHOD AND SYSTEM FOR PHOTOVOLTAIC INVERTERS WHOSE AC SIDES ARE CONNECTED IN PARALLEL

CROSS REFERENCE TO RELATED APPLICATIONS

The present application claims the priority to Chinese Patent Application No. 201410852886.2, titled "CONTROL METHOD AND SYSTEM FOR PHOTOVOLTAIC INVERTERS WHOSE AC SIDES ARE CONNECTED IN PARALLEL", filed on Dec. 31, 2014 with the State Intellectual Property Office of People's Republic of China, which is incorporated herein by reference in its entirety.

FIELD

The disclosure relates to the technical field of photovoltaic power generation, and in particular to a control method and system for photovoltaic inverters whose alternating current (AC) sides are connected in parallel.

BACKGROUND

With the increasing capacity of the new energy power plant, in order to achieve an optimal configuration of capacity of a grid-tied inverter, and to implement a solution of a megawatt system, parallel connection of inverters has become the trend of technical development. Parallel connection of AC sides of inverters has the following advantages.

A double split transformer at the AC side may be replaced by a two-winding transformer to reduce investment costs of the system, which retains original maximum power point tracking (MPPT), and has few modifications to the layout and structure of the system.

Figure 1:
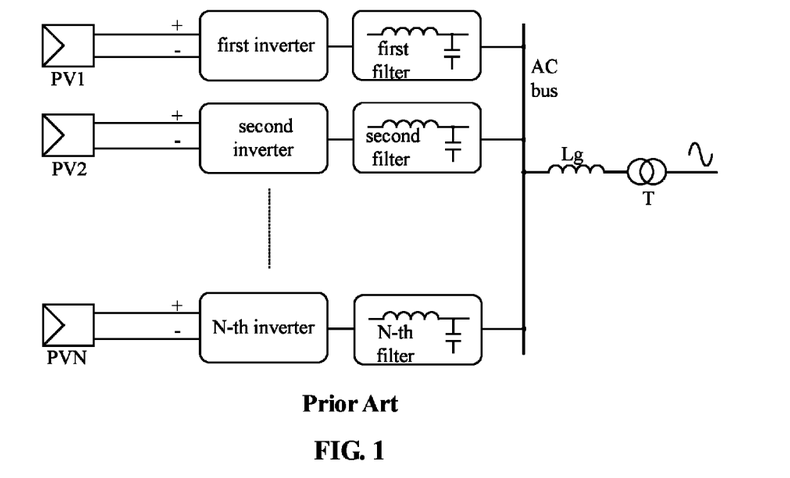
FIG. 1 is a schematic diagram of inverters whose AC sides are connected in parallel in the conventional technology.

Referring to FIG. 1, a schematic diagram of inverters whose AC sides are connected in parallel in the conventional technology is shown.

PV1 to PVN are N PV arrays, that is an input terminal of each inverter is connected with an output terminal of a respective PV array, the first inverter to the Nth inverter are N inverters connected in parallel, the first filter to the Nth filter are N AC filters for the N inverters, and T is a two-winding transformer.

An AC bus is shared by the AC sides of the inverters, and DC sides of the inverters are connected to independent PV arrays respectively, thus N-way maximum power point tracking MPPT are performed, that is, MPPT of each inverter is performed independently.

Figure 2:
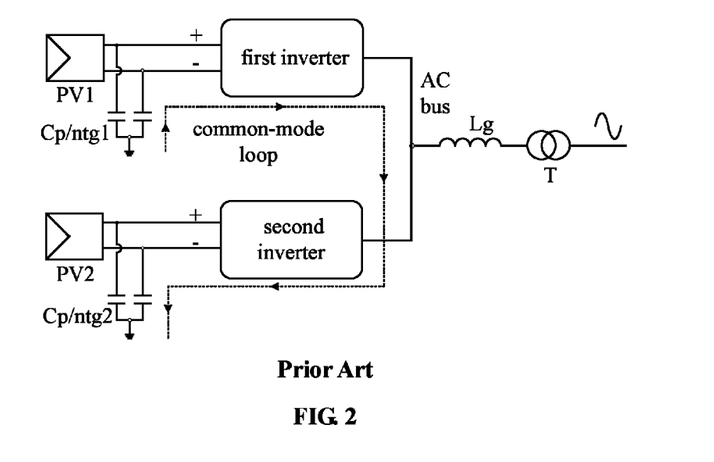
FIG. 2 is a schematic diagram of a common-mode loop corresponding to the system shown in FIG. 1.

Regardless of the advantages of the inverters whose AC sides are connected in parallel, the positive terminal and the negative terminal of the PV array have parasitic capacitances to ground, such that there is a coupling at a respective DC side of each inverter thereby forming a common-mode loop and causing a problem of common-mode circulation current. Referring to FIG. 2, a schematic diagram of a common-mode loop corresponding to the system shown in FIG. 1 is shown, where Cp/ntg1 is a parasitic capacitance of PV1 to ground, Cp/ntg2 is a parasitic capacitance of PV2 to ground. It can be seen that two inverters connected in parallel are coupled with each other through the parasitic capacitances to form a common-mode loop.

Therefore, it is a need for those skilled in the art to provide a control method and system for photovoltaic inverters whose AC sides connected in parallel, to restrain the problem of the common-mode loop for the system in which the AC sides of the inverters are connected in parallel.

SUMMARY

The present disclosure is to provide a control method and system for photovoltaic inverters whose AC sides connected in parallel, to solve the problem of the common-mode loop for the system in which the AC sides of the inverters are connected in parallel.

According to the embodiments of the disclosure, there is provided a control method for photovoltaic inverters whose AC sides connected in parallel, which is applied to a system in which AC sides of the inverters are connected in parallel and DC sides of the inverters are independent from each other, where the system includes at least two inverters, i.e., a first inverter and a second inverter, where an input terminal of the first inverter is connected with a first PV array, an input terminal of the second inverter is connected with a second PV array, the first PV array and the second PV array each have a parasitic capacitance to ground, and the first inverter is coupled with the second inverter through the parasitic capacitances, to form a common-mode loop. The method includes:
  detecting a first direct voltage of the first inverter and a second direct voltage of the second inverter;
  obtaining a difference between the first direct voltage and the second direct voltage; and
  adjusting the direct voltages of the inverters to control the difference to be within a predetermined range and to control a common-mode voltage in the common-mode loop to be within a predetermined common-mode voltage range.

Preferably, the obtaining a difference between the first direct voltage and the second direct voltage; and adjusting the direct voltages of the inverters to control the difference to be within a predetermined range includes:
  obtaining an absolute value of the difference between the first direct voltage and the second direct voltage, and adjusting the direct voltages of the inverters to control the absolute value to be smaller than a predetermined voltage.

Preferably, the first inverter is a host inverter, and the second inverter is a slave inverter; and
  the control the absolute value to be smaller than a predetermined voltage includes:
  adjusting the direct voltage of the slave inverter based on the direct voltage of the host inverter to control the absolute value to be smaller than the predetermined voltage.

Preferably, before receiving the direct voltage of the host inverter transmitted from the host inverter, the method further includes:
  controlling a carrier wave of the host inverter to be synchronized with a carrier wave of the slave inverter to control a phase of the common-mode voltage to be within a predetermined phase range.

According to the embodiments of the disclosure, there is provided a control apparatus for photovoltaic inverters whose AD sides are connected in parallel, which includes: a detection unit, a difference obtaining unit and a control unit; where
  the detection unit is configured to detect a first direct voltage of a first inverter and a second direct voltage of a second inverter;

the difference obtaining unit is configured to obtain a difference between the first direct voltage and the second direct voltage; and the control unit is configured to adjust the direct voltages of the inverters to control the difference to be within a predetermined range.

Preferably, the difference obtaining unit includes an absolute value obtaining sub-unit;

where the absolute value obtaining sub-unit is configured to obtain an absolute value of the difference between the first direct voltage and the second direct voltage; and the control unit includes a control sub-unit configured to adjust the direct voltages of the inverters to control the absolute value to be smaller than a predetermined voltage.

Preferably, the control sub-unit includes a following sub-unit configured to adjust a direct voltage of a slave inverter based on a direct voltage of a host inverter to control the absolute value to be smaller than the predetermined voltage.

According to the embodiments of the disclosure, there is further provided a system in which AC sides of inverters are connected in parallel, which includes: at least two inverters i.e., a first inverter and a second inverter, where an input terminal of the first inverter is connected with a first PV array, an input terminal of the second inverter is connected with a second PV array, the first PV array and the second PV array each have a parasitic capacitance to ground, and the first inverter is coupled with the second inverter through the parasitic capacitances to form a common-mode loop.

the AC side of the first inverter and the AC side of the second inverter are connected in parallel, and a DC side of the first inverter is independent from a DC side of the second inverter;

the first inverter functions as a host inverter, and the second inverter functions as a slave inverter;

the host inverter is configured to transmit a direct voltage of the host inverter to the slave inverter; and the slave inverter is configured to obtain a difference between the direct voltage of the host inverter and a direct voltage of the slave inverter, and adjust the direct voltage of the slave inverter to control the difference to be within a predetermined range and to control a common-mode voltage in the common-mode loop to be within a predetermined common-mode voltage range.

Preferably, a carrier wave of the host inverter is controlled to be synchronized with a carrier wave of the slave inverter to control a phase of the common-mode voltage to be within a predetermined phase range.

Preferably, the slave inverter is configured to obtain an absolute value of the difference between the direct voltage of the host inverter and the direct voltage of the slave inverter, and operate based on the direct voltage of the host inverter to control the absolute value to be smaller than a predetermined voltage.

As compared with the conventional technology, the present disclosure has the following advantages.

In the conventional technology, inverters whose DC sides are independent from each other perform respective MPPTs such that the inverters may have significantly different direct voltages, therefore there is a common-mode circulation current. In the method according to the present disclosure, control is performed on a basis that MPPTs are independently performed on respective inverters connected in parallel, on a premise that a difference between direct operation voltages meets a predetermined condition. That is, the DC voltages of the inverters connected in parallel are detected, the difference between direct voltages of inverters is obtained, and the difference is controlled to be within a predetermined range by adjusting the direct voltages at which the inverters operate. In this way, the smaller the difference between direct voltages of the inverters is, the smaller the common-mode voltage difference between the inverters is, and the smaller the common-mode current is, thereby restraining the common-mode circulation current between the inverters. It may be understood that, direct voltages at which the inverters operate are the same in a case that the difference is 0, which indicates that there is no common-mode current between inverters. In practice, generally the inverters operate at slightly different direct voltages. In a case that the difference between the direct voltages is within a predetermined range, a common-mode current corresponding thereto is acceptable. In a case that the difference is outside the predetermined range, it is indicated that the common-mode current is large, which is a serious problem and needs to be controlled.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

To make the objectives, features and advantages of the disclosure more obvious and more understandable, the embodiments of the disclosure are described in detail in conjunction with the drawings as follows.

First Method Embodiment

Figure 3:
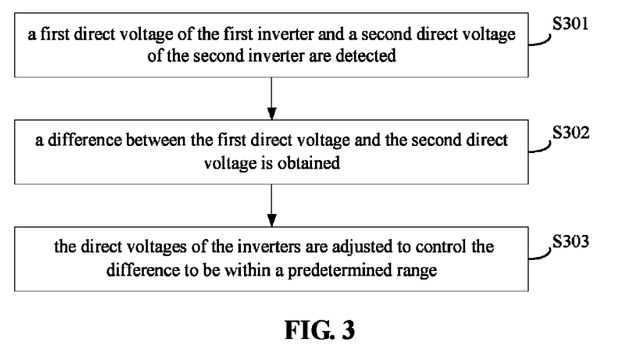
FIG. 3 is a flow chart of a control method for photovoltaic inverters whose AC sides are connected in parallel according to a first method embodiment of the disclosure.

FIG. 3 shows a flow chart of a control method for photovoltaic inverters whose AC sides are connected in parallel according to a first method embodiment of the disclosure.

The control method for photovoltaic inverters whose AC sides are connected in parallel is provided according to the embodiment of the disclosure, which is applied to an inverter system in which AC sides of inverters are connected in parallel, and DC sides of the inverters are independent from each other, where the system includes at least two inverters, i.e., a first inverter and a second inverter, where an input terminal of the first inverter is connected with a first PV array, an input terminal of the second inverter is connected with a second PV array, the first PV array and the second PV array each have a parasitic capacitance to ground, and the first inverter is coupled with the second inverter through the parasitic capacitances, which forms a common-mode loop.

The method includes the following steps S301 to S303.

In step S301, a first direct voltage of the first inverter and a second direct voltage of the second inverter are detected.

It should be noted that, each inverter operates with a respective direct voltage since the DC sides of the inverter are independent from each other.

In step S302, a difference between the first direct voltage and the second direct voltage is obtained.

There is a common-mode current between two inverters if there is a difference between direct voltages of these two inverters. Referring to FIG. 2, the formation process of the common-mode current is described as follows.

According to the Ohm's law, a current in a loop may be represented as, $$I_{or} = \frac{U_m}{X_o} \quad (1)$$

where $I_{or}$ is a common-mode circulation current, $U_m$ is a common-mode voltage of the loop, $X_o$ is a common-mode impedance of the loop. It can be seen from equation (1) that the common-mode circulation current may be reduced by:

(1) reducing the common-mode voltage of the common-mode loop; or (2) increasing the common-mode impedance of the common-mode loop.

Since the common-mode impedance of the common-mode loop is related to parasitic parameters of the PV array to ground and can not be calculated accurately, which is inconvenient for the system design, the common-mode circulation current is reduced by reducing the common-mode voltage of the common-mode loop in the disclosure.

$U_m$ is the common-mode voltage of the loop. For the system in which inverters are connected in parallel, $U_m$ may be expressed as a common-mode voltage difference between inverters connected in parallel. A case that the system includes two inverters is taken as an example, where the common-mode voltage may be represented by equation (2), $$U_m = V_{01}(t) - V_{02}(t) \quad (2)$$

where $V_{01}(t)$ is a common-mode voltage of the first inverter, $V_{02}(t)$ is a common-mode voltage of the second inverter. It can be seen that, $U_m$ is related to amplitudes and phases of $V_{01}(t)$ and $V_{02}(t)$. It is assumed that $V_{01}(t)$ and $V_{02}(t)$ have a same amplitude and a same phase, then $U_m$ is 0, in this case, the common-mode circulation current is unrelated to the common-mode impedance, thereby restricting the common-mode circulation current.

In step S303, the direct voltages of the inverters are adjusted to control the difference to be within a predetermined range, to control the common-mode voltage in the common-mode loop to be within a predetermined common-mode voltage range.

It may be understood that, the direct voltage of each of the inverters may be adjusted, or the direct voltage of one of the inverters may be taken as a basis, and a direct voltage of the other inverter may be adjusted.

According to the present embodiment, the difference between direct voltages of the inverters is controlled to be within the predetermined range. It can be seen from equation (2), that the smaller the difference between the two voltages is, the smaller the common-mode voltage difference is.

In the conventional technology, each of the inverters whose AC sides are connected in parallel and DC sides are independent from each other performs a respective MPPT, therefore each of the inverters operates at a direct voltage corresponding to a respective maximum power point, such that there may be a big difference between direct voltages of the inverters. For example, an inverter operates at a direct voltage of 500 V, while another inverter operates at a direct voltage of 600 V, such that a common-mode voltage between the two inverters is large. In the conventional technology, the maximum output power of the inverter is pursued, without considering such a problem. In the method according to the present disclosure, in controlling MPPT of the inverter, the difference between direct voltages has a higher priority than the maximum power point of MPPT. That is, a larger output power is pursued on a premise that the difference between direct voltages meets a predetermined condition.

In the method according to the present disclosure, the difference between the direct voltages of the inverters may be obtained by detecting respective direct voltages of the inverters connected in parallel, and the difference may be controlled to be within the predetermined range by adjusting the direct voltages at which the inverters operate. The smaller the difference between the direct voltages of the inverters is, the smaller the common-mode voltage difference between the inverters is, and the smaller the common-mode current is, thus restraining the common-mode circulation current between inverters.

It may be understood that, the inverters operate at a same direct voltage in a case that the difference between the direct voltages of the inverters is 0, such that there is no common-mode current between the inverters. In practice, the inverters generally operate at slightly different direct voltages. In a case that the difference between the direct voltages is within a predetermined range, a common-mode current corresponding thereto is acceptable. In a case that the difference is outside the predetermined range, it is indicated that the common-mode current is large, which is a serious problem and needs to be controlled.

Second Method Embodiment

Figure 4:
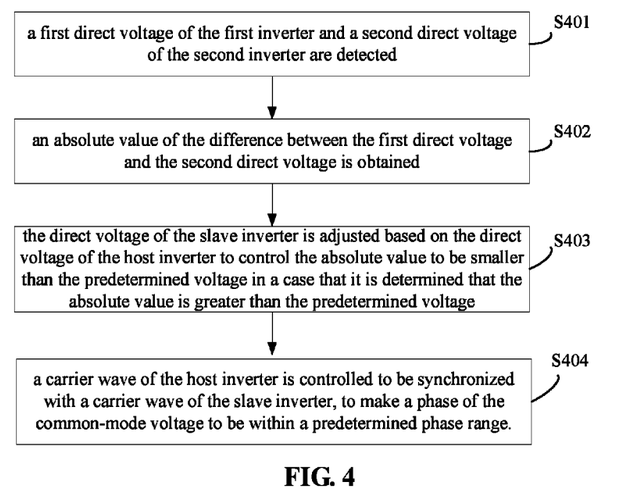
FIG. 4 is a flow chart of a control method for photovoltaic inverters whose AC sides are connected in parallel according to a second method embodiment of the disclosure.

Referring to FIG. 4, a flow chart of a control method for photovoltaic inverters whose AC sides are connected in parallel according to a second method embodiment of the disclosure is shown.

In the present embodiment, a case that inverters connected in parallel are classified into host inverters and slave inverters is taken as an example for illustration. For example, a first inverter is a host inverter and a second inverter is a slave inverter.

In step S401, a first direct voltage of the first inverter and a second direct voltage of the second inverter are detected.

Specially, the host inverter transmits the first direct voltage of the host inverter to the slave inverter, and the slave inverter compares the first direct voltage with the second direct voltage of the slave inverter.

It may be understood that the inverters connected in parallel can communicate with each other.

In step S402, an absolute value of the difference between the first direct voltage and the second direct voltage is obtained.

It may be understood that the difference may be positive or negative. Therefore, to facilitate comparison, the absolute value of the difference may be obtained, and the absolute value is directly compared with a positive predetermined voltage.

In step S403, the direct voltage of the slave inverter is adjusted based on the direct voltage of the host inverter to control the absolute value to be smaller than the predetermined voltage in a case that it is determined that the absolute value is greater than the predetermined voltage.

It should be noted that, the predetermined voltage may be set according to actual parameters of the inverters. For example, the predetermined voltage may be set according to the voltages at the DC sides and the voltages at the AC sides of the inverters connected in parallel. The predetermined voltage defines an allowable deviation range for the voltage.

Furthermore, in step S404, a carrier wave of the host inverter needs to be controlled to be synchronized with a carrier wave of the slave inverter, to make a phase of $V01(t)$ consistent with a phase of $V02(t)$.

In the conventional technology, each of the direct voltages of the inverters whose AC sides connected in parallel is controlled independently. Therefore it is difficult to keep the amplitude of $V_{01}(t)$ to be consistent with the amplitude of $V_{02}(t)$. With the method according to the present disclosure, it is ensured that the amplitude of $V_{01}(t)$ is consistent with the amplitude of $V_{02}(t)$.

In the method according to the embodiment, the slave inverter is controlled to operate at a direct voltage around the direct voltage of the host inverter based on the host inverter, i.e., based on the direct voltage of the host inverter. In this way, the maximum power of the slave inverter is sacrificed, and the slave inverter is controlled to follow the operation of the host inverter based on the maximum power of the host inverter. Thus the absolute value of the difference between direct voltages of the inverters connected in parallel is controlled to be smaller than a predetermined voltage. In this way, a common-mode current between the inverters may be controlled to be within a predetermined current range, thus the common-mode current is restrained.

It may be understood that, in a case that the system includes more than two inverters, one of the inverters is taken as the host inverter and the other inverters are taken as slave inverters, which has the same control principle as the case that the system has two inverters, and is not described here in detail.

In a case that multiple inverters are connected in parallel, one of the inverters may be chosen as the host inverter according to a predetermined rule. For example, one of the inverters is chosen as the host inverter according to number, an external configuration or a current output power of the inverter.

First Apparatus Embodiment

Figure 5:
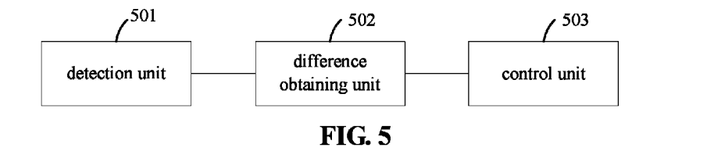
FIG. 5 is a schematic diagram of a control apparatus for photovoltaic inverters whose AC sides are connected in parallel according to a first apparatus embodiment of the disclosure.

FIG. 5 shows a schematic diagram of a control apparatus for photovoltaic inverters whose AC sides are connected in parallel according to a first apparatus embodiment of the disclosure.

The control apparatus for photovoltaic inverters whose AC sides are connected in parallel according to the embodiment includes a detection unit 501, a difference obtaining unit 502 and a control unit 503.

The detection unit 501 is configured to detect a first direct voltage of the first inverter and a second direct voltage of the second inverter.

It should be noted that, each inverter operates with a respective direct voltage since DC sides of the inverter are independent from each other.

The difference obtaining unit 502 is configured to obtain a difference between the first direct voltage and the second direct voltage.

There is a common-mode current between two inverters if there is a difference between direct voltages of these two inverters.

The control unit 503 is configured to adjust the direct voltages of the inverters to control the difference to be within a predetermined range.

It may be understood that, the direct voltage of each of the inverters may be adjusted, or the direct voltage of one of the inverters may be taken as a basis, and a direct voltage of the other inverter may be adjusted.

The apparatus according to the present embodiment may be arranged in the host inverter or the slave inverter, or may be independent from the host inverter and the slave inverter.

According to the present embodiment, the difference between the direct voltages of the inverters is controlled to be within the predetermined range. It can be seen from equation (2) that, the smaller the difference between the two voltages is, the smaller the common-mode voltage difference is.

The device according to present embodiment obtains the difference between the direct voltages of the inverters by detecting respective direct voltages of the inverters connected in parallel, and controls the difference to be within the predetermined range by adjusting direct voltages at which the inverters operate. The smaller the difference between direct voltages of inverters is, the smaller the common-mode voltage difference between the inverters is, and the smaller common-mode current is, thus restraining the common-mode circulation current between the inverters.

It may be understood that, the inverters operate at a same direct voltage in a case that the difference between the direct voltages of the inverters is 0, such that there is no common-mode current between the inverters. In practice, the inverters generally operate at different direct voltages. In a case that the small differences between the direct voltages are within the predetermined range, a common-mode current corresponding thereto is acceptable. In a case that the differences are outside the predetermined range, it is indicated that the common-mode current is large, which is a serious problem and needs to be controlled.

Second Apparatus Embodiment

Figure 6:
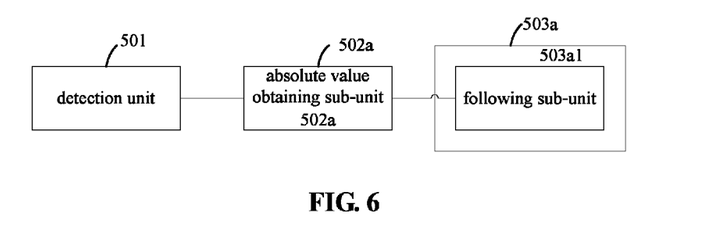
FIG. 6 is a schematic diagram of a control apparatus for photovoltaic inverters whose AC sides are connected in parallel according to a second apparatus embodiment of the disclosure.

Referring to FIG. 6, a schematic diagram of a control apparatus for photovoltaic inverters whose AC sides are connected in parallel according to a second apparatus embodiment of the disclosure is shown.

In the present embodiment, a case that the apparatus is arranged in a slave inverter is taken as an example. It may be understood that, in a case that there are multiple slave inverters, each of the slave inverters includes the apparatus.

Specially, a host inverter transmits a first direct voltage of the host inverter to the slave inverter, and the slave inverter compares the first direct voltage of the host inverter with the second direct voltage of the slave inverter.

It may be understood that the inverters connected in parallel can communicate with each other.

The difference obtaining unit includes an absolute value obtaining sub-unit 502a.

The absolute obtaining sub-unit 502a is configured to obtain an absolute value of the difference between the first direct voltage and the second direct voltage.

It may be understood that the difference may be positive or negative. Therefore, to facilitate comparison, the absolute value of the difference may be obtained, and the absolute value is directly compared with a positive predetermined voltage.

The control unit includes a control sub-unit 503a configured to adjust the direct voltages of the inverters to control the absolute value to be smaller than a predetermined voltage.

The control sub-unit includes a following sub-unit 503a1 configured to adjust the direct voltage of the slave inverter based on the direct voltage of the host inverter to control the absolute value to be smaller than the predetermined voltage.

It should be noted that, the predetermined voltage may be set according to actual parameters of the inverters. For example, the predetermined voltage may be set according to the voltages at the DC sides and the voltages at the AC sides of the inverters connected in parallel. The predetermined voltage defines an allowable deviation range for the voltage.

Furthermore, a carrier wave of the host inverter needs to be controlled to be synchronized with a carrier wave of the slave inverter, to make a phase of $V_{o1}(t)$ consistent with a phase of $V_{o2}(t)$.

In the conventional technology, each of the direct voltages of the inverters whose AC sides connected in parallel is controlled independently. Therefore it is difficult to keep the amplitude of $V_{o1}(t)$ to be consistent with the amplitude of $V_{o2}(t)$. With the method according to the present disclosure, it is ensured that the amplitude of $V_{o1}(t)$ is consistent with the amplitude of $V_{o2}(t)$.

The apparatus according to the present embodiment controls the slave inverter to operate at a direct voltage around the direct voltage of the host inverter based on the host inverter, i.e., based on the direct voltage of the host inverter. In this way, the maximum power of the slave inverter is sacrificed, and the slave inverter is controlled to follow the operation of the host inverter based on the maximum power of the host inverter Thus the absolute value of the difference between direct voltages of the inverters connected in parallel is controlled to be smaller than a predetermined voltage. In this way, a common-mode current between the inverters may be controlled to be within a predetermined current range, thus the common-mode current is restrained.

It may be understood that, in a case that there are more than two inverters, one of the inverters is taken as the host inverter and the other inverters are taken as slave inverters, which has the same control principle as the case that the there are two inverters, and is not described here in detail.

In a case that multiple inverters are connected in parallel, one of the inverters may be chosen as the host inverter according to a predetermined rule. For example, one of the inverters is chosen as the host inverter according to number, an external configuration or a current output power of the inverter.

First System Embodiment

Figure 7:
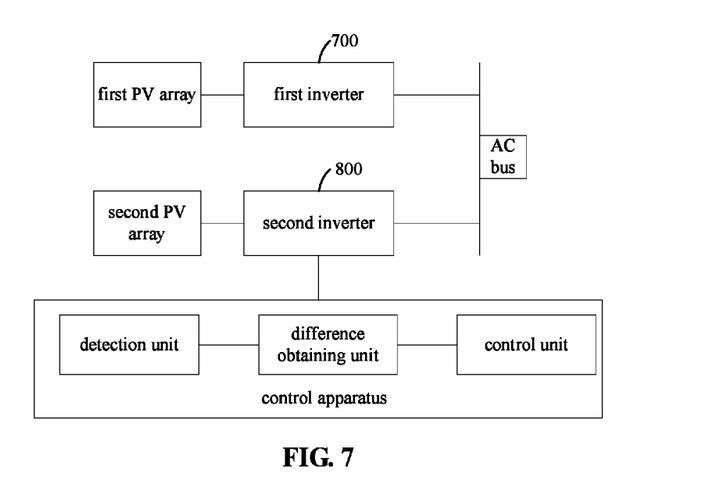
FIG. 7 is a schematic diagram of a system in which AC sides of photovoltaic inverters are connected in parallel according to a first system embodiment of the disclosure.

FIG. 7 shows a schematic diagram of a first embodiment of a system in which AC sides of photovoltaic inverters are connected in parallel according to the disclosure.

The system in which AC sides of photovoltaic inverters are connected in parallel according to the present embodiment includes at least two inverters, i.e., a first inverter 700 and a second inverter 800, where an input terminal of the first inverter 700 is connected with a first PV array, an input terminal of the second inverter 800 is connected with a second PV array, the first PV array and the second PV array each have a parasitic capacitance to ground, and the first inverter 700 is coupled with the second inverter 800 through the parasitic capacitances, which forms a common-mode loop; AC sides of the first inverter 700 and the second inverter 800 are connected in parallel, and DC sides of the first inverter 700 and the second inverter 800 are independent from each other; and the first inverter 700 serves as a host inverter, and the second inverter 800 serves as a slave inverter.

The host inverter 700 is configured to transmit a direct voltage of the host inverter 700 to the slave inverter 800.

It should be noted that, each inverter operates with a respective direct voltage since the DC sides of the inverter are independent from each other.

There is a common-mode current between two inverters if there is a difference between direct voltages of these two inverters.

The slave inverter 800 is configured to obtain the difference between the direct voltage of the host inverter and a direct voltage of the slave inverter, and adjust the direct voltage of the slave inverter to control the difference to be within a predetermined range and to control a common-mode voltage in the common-mode loop to be within a predetermined common-mode voltage range.

According to the present embodiment, the difference between direct voltages of the inverters is controlled to be within the predetermined range. It can be seen from equation (2) that, the smaller the difference between the two voltages is, the smaller the common-mode voltage difference is.

In the method according to the present disclosure, the difference between the direct voltages of the inverters may be obtained by detecting respective direct voltages of the inverters connected in parallel, and the difference may be controlled to be within the predetermined range by adjusting the direct voltages at which the inverters operate. The smaller the difference between the direct voltages of the inverters is, the smaller the common-mode voltage difference between the inverters is, and the smaller the common-mode current is, thus restraining the common-mode circulation current between inverters.

It may be understood that, the inverters operate at a same direct voltage in a case that the difference between the direct voltages of the inverters is 0, such that there is no common-mode current between the inverters. In practice, the inverters generally operate at different direct voltages. In a case that the different direct voltages have small differences, a common-mode current corresponding thereto is acceptable. In a case that the differences are outside the predetermined range, it is indicated that the common-mode current is large, which is a serious problem and needs to be controlled.

Furthermore, a carrier wave of the host inverter needs to be controlled to be synchronized with a carrier wave of the slave inverter, to make a phase of $V_{o1}(t)$ consistent with a phase of $V_{o2}(t)$. That is, the synchronization of the carrier waves is to keep the phase of $V_{o1}(t)$ to be consistent with the phase of $V_{o2}(t)$.

In the conventional technology, each of the direct voltages of the inverters whose AC sides connected in parallel is controlled independently. Therefore it is difficult to keep the amplitude of $V_{o1}(t)$ to be consistent with the amplitude of $V_{o2}(t)$. With the method according to the present disclosure, it is ensured that the amplitude of $V_{o1}(t)$ is consistent with the amplitude of $V_{o2}(t)$.

The slave inverter is configured to obtain an absolute value of the difference between the direct voltage of the host inverter and the direct voltage of the slave inverter, and operate on the basis of the direct voltage of the host inverter, to control the absolute value to be smaller than the predetermined voltage.

With the system according to the above embodiments, the common-mode current between the inverters whose DC sides are independent from each other, and AC sides are connected in parallel is restrained. In addition, normal operations of other inverters are not affected, in a case that a failure occurs on one inverter.

The foregoing embodiments are only preferred embodiments of the disclosure and are not meant to limit the disclosure. The preferred embodiments according to the disclosure are disclosed above, and are not intended to limit the disclosure. Those of skills in the art may make, based on the disclosed method and technical content, some variations and improvements on the technical solutions of the disclosure, or make some equivalent variations on the embodiments without departing from the scope of the technical solutions. All simple modifications, equivalent variations and improvements made based on the technical essence of the disclosure without departing from content of the technical solutions of the disclosure fall in the scope of the technical solutions of the disclosure.

The invention claimed is:

1. A control method for photovoltaic inverters whose AC sides are connected in parallel, applied to a system in which AC sides of inverters are connected in parallel and DC sides of the inverters are independent from each other, wherein the system comprises at least two inverters which are a first inverter and a second inverter, wherein an input terminal of the first inverter is connected with a first PV array, an input terminal of the second inverter is connected with a second PV array, the first PV array and the second PV array each have a parasitic capacitance to ground, and the first inverter is coupled with the second PV array through the parasitic capacitances to form a common-mode loop; wherein the method comprises:
   detecting a first direct voltage of the first inverter and a second direct voltage of the second inverter;
   obtaining a difference between the first direct voltage and the second direct voltage; and
   adjusting the direct voltages of the inverters to control the difference to be within a predetermined range and to control a common-mode voltage in the common-mode loop to be within a predetermined common-mode voltage range.

2. The control method for photovoltaic inverters whose AC sides are connected in parallel according to claim 1, wherein the obtaining a difference between the first direct voltage and the second direct voltage; and adjusting the direct voltages of the inverters to control the difference to be within a predetermined range comprises:
   obtaining an absolute value of the difference between the first direct voltage and the second direct voltage, and adjusting the direct voltages of the inverters to control the absolute value to be smaller than a predetermined voltage.

3. The control method for photovoltaic inverters whose AC sides are connected in parallel according to claim 2, wherein the first inverter is a host inverter, and the second inverter is a slave inverter; and
   the control the absolute value to be smaller than the predetermined voltage comprises:
   adjusting the direct voltage of the slave inverter based on the direct voltage of the host inverter to control the absolute value to be smaller than the predetermined voltage.

4. The control method for photovoltaic inverters whose AC sides are connected in parallel according to claim 1, wherein before receiving the direct voltage of the host inverter transmitted from the host inverter, the method further comprises:
   controlling a carrier wave of the host inverter to be synchronized with a carrier wave of the slave inverter to control a phase of the common-mode voltage to be within a predetermined phase range.

5. A control apparatus for photovoltaic inverters whose AC sides are connected in parallel, comprising: a detection unit, a difference obtaining unit and a control unit, wherein
   the detection unit is configured to detect a first direct voltage of the first inverter and a second direct voltage of the second inverter;
   the difference obtaining unit is configured to obtain a difference between the first direct voltage and the second direct voltage; and
   the control unit is configured to adjust the direct voltages of the inverters to control the difference to be within a predetermined range.

6. The control apparatus for photovoltaic inverters whose AC sides are connected in parallel according to claim 5, wherein the difference obtaining unit comprises an absolute value obtaining sub-unit;
   wherein the absolute value obtaining sub-unit is configured to obtain an absolute value of the difference between the first direct voltage and the second direct voltage; and
   the control unit comprises a control sub-unit configured to adjust the direct voltages of the inverters to control the absolute value to be smaller than a predetermined voltage.

7. The control apparatus for photovoltaic inverters whose AC sides are connected in parallel according to claim 6, wherein the control sub-unit comprises a following sub-unit configured to adjust a direct voltage of a slave inverter based on a direct voltage of a host inverter to control the absolute value to be smaller than the predetermined voltage.

8. A photovoltaic inverter system in which AC sides of inverters are connected in parallel, comprising: at least two inverters which are a first inverter and a second inverter, wherein an input terminal of the first inverter is connected with a first PV array, an input terminal of the second inverter is connected with a second PV array, the first PV array and the second PV array each have a parasitic capacitance to ground, and the first inverter is coupled with the second inverter through the parasitic capacitances to form a common-mode loop;

wherein the AC side of the first inverter and the AC side of the second inverter are connected in parallel, and a DC side of the first inverter is independent from a DC side of the second inverter;

wherein the first inverter functions as a host inverter, and the second inverter functions as a slave inverter;

wherein the host inverter is configured to transmit a direct voltage of the host inverter to the slave inverter;

wherein the slave inverter is configured to obtain a difference between the direct voltage of the host inverter and a direct voltage of the slave inverter, and adjust the direct voltage of the slave inverter to control the difference to be within a predetermined range and to control a common-mode voltage in the common-mode loop to be within a predetermined common-mode voltage range.

9. The photovoltaic inverter system in which AC sides of inverters are connected in parallel according to claim 8, wherein a carrier wave of the host inverter is controlled to be synchronized with a carrier wave of the slave inverter to control a phase of the common-mode voltage to be within a predetermined phase range.

10. The photovoltaic inverter system in which AC sides of inverters are connected in parallel according to claim 8, wherein the slave inverter is configured to obtain an absolute value of the difference between the direct voltage of the host inverter and the direct voltage of the slave inverter, and adjust the direct voltage of the slave inverter based on the direct voltage of the host inverter to control the absolute value to be smaller than a predetermined voltage.

* * * * *